(12) United States Patent
Buczynski

(10) Patent No.: US 11,761,468 B2
(45) Date of Patent: Sep. 19, 2023

(54) STUD CLIP ASSEMBLY AND METHOD

(71) Applicant: ILLINOIS TOOL WORKS INC., Glenview, IL (US)

(72) Inventor: Gregory George Buczynski, Ferndale, MI (US)

(73) Assignee: Illinois Tool Works Inc., Glenview, IL (US)

( * ) Notice: Subject to any disclaimer, the term of this patent is extended or adjusted under 35 U.S.C. 154(b) by 735 days.

(21) Appl. No.: 16/790,693

(22) Filed: Feb. 13, 2020

(65) Prior Publication Data
US 2020/0263716 A1 Aug. 20, 2020

Related U.S. Application Data

(60) Provisional application No. 62/807,701, filed on Feb. 19, 2019.

(51) Int. Cl.
*F16B 37/08* (2006.01)
*F16B 5/02* (2006.01)
*F16B 5/06* (2006.01)

(52) U.S. Cl.
CPC .......... *F16B 5/0258* (2013.01); *F16B 5/0614* (2013.01); *F16B 37/0842* (2013.01); *F16B 37/0857* (2013.01)

(58) Field of Classification Search
CPC ...... F16B 5/121; F16B 37/02; F16B 37/0857; F16B 37/0842; F16B 5/0258; F16B 5/0614

USPC ........ 411/522–524, 174, 176, 254, 277, 283, 411/334, 335

See application file for complete search history.

(56) References Cited

U.S. PATENT DOCUMENTS

| | | | | | |
|---|---|---|---|---|---|
| 2,286,981 | A | * | 6/1942 | Todd | F16B 37/02 411/282 |
| 2,657,442 | A | * | 11/1953 | Bedford, Jr. | F16L 3/13 248/74.2 |
| 3,123,880 | A | * | 3/1964 | Barry | F16B 5/10 411/524 |
| 3,358,729 | A | * | 12/1967 | Munse | F16B 37/041 411/970 |
| 3,414,035 | A | * | 12/1968 | Munse | F16B 37/041 411/970 |
| 3,426,818 | A | * | 2/1969 | Derby | F16B 37/041 411/970 |
| 3,758,938 | A | * | 9/1973 | Simmons | B25B 21/001 81/10 |
| 3,805,863 | A | * | 4/1974 | Starr | F16B 39/28 411/335 |
| 3,989,081 | A | * | 11/1976 | Sigmund | F16B 19/05 29/520 |

(Continued)

*Primary Examiner* — Gary W Estremsky
(74) *Attorney, Agent, or Firm* — Quarles & Brady LLP

(57) ABSTRACT

A stud clip assembly is provided. The stud clip assembly includes a clip having a mounting platform and a retention platform. The mounting platform includes a mounting bore that extends away from the retention platform and that defines a mounting aperture. The mounting aperture includes a threaded portion formed therein and a collar arranged at a first end thereof. The stud clip assembly further includes a fastening element configured to be threaded into the threaded portion of the mounting aperture. The collar is configured to be crimped onto the fastening element.

15 Claims, 5 Drawing Sheets

(56) References Cited

U.S. PATENT DOCUMENTS

| | | | | |
|---|---|---|---|---|
| 4,684,305 | A * | 8/1987 | Dubost | F16B 37/041 411/174 |
| 4,729,706 | A * | 3/1988 | Peterson | F16B 37/02 D8/395 |
| 4,897,005 | A * | 1/1990 | Peterson | F16B 37/02 411/174 |
| 5,039,264 | A * | 8/1991 | Benn | F16B 37/041 411/523 |
| 5,827,026 | A * | 10/1998 | Patti | F16B 2/065 411/174 |
| 5,890,858 | A * | 4/1999 | Leroux | F16B 37/041 411/175 |
| 6,448,496 | B1 * | 9/2002 | Daoud | H02G 3/088 285/154.4 |
| 7,101,131 | B2 * | 9/2006 | Herb | F16B 37/045 411/84 |
| 2004/0165965 | A1 * | 8/2004 | Unverzagt | F16B 37/0807 411/84 |
| 2009/0003961 | A1 * | 1/2009 | Benkel | F16B 37/043 411/366.1 |
| 2011/0311331 | A1 * | 12/2011 | Tejero Salinero | F16B 37/02 411/175 |
| 2018/0087692 | A1 * | 3/2018 | Geiger | F16L 3/04 |

\* cited by examiner

STUD CLIP ASSEMBLY AND METHOD

CROSS-REFERENCES TO RELATED APPLICATIONS

The present application is based on and claims priority to U.S. Provisional Patent Application No. 62/807,701, filed on Feb. 19, 2019. The entire disclosure of which is incorporated herein by reference in its entirety.

STATEMENT REGARDING FEDERALLY SPONSORED RESEARCH

Not Applicable.

BACKGROUND

Generally, stud clip assemblies may include a clip that is configured to receive a fastening element. The clip may receive a component (e.g., a plate, a panel, a conduit, etc.), and the fastening element may secure the component to the clip.

BRIEF SUMMARY

In one aspect, the present disclosure provides a stud clip assembly that includes a clip having a mounting platform and a retention platform. The mounting platform includes a mounting bore that extends away from the retention platform and that defines a mounting aperture. The mounting aperture includes a threaded portion formed therein and a collar arranged at a first end thereof. The stud clip assembly further includes a fastening element configured to be threaded into the threaded portion of the mounting aperture. The collar is configured to be crimped onto the fastening element.

In one aspect, the present disclosure provides a clip for a stud clip assembly that includes a mounting platform having a mounting bore that defines a mounting aperture. The mounting aperture includes a threaded portion formed therein and a collar arranged at a first end thereof. The clip further includes a retention platform connected to the mounting platform through one or more arms. A gap is formed between the mounting platform and each of the one or more arms at laterally opposing sides of the mounting platform to enable the mounting platform to flex relative to the retention platform.

In one aspect, the present disclosure provides a method of manufacturing a stud clip assembly. The method includes forming a mounting bore on a mounting platform of a clip. The mounting bore includes a mounting aperture having a threaded portion and a collar. The method further includes bending the clip into a desired shape, threading a fastening element into the threaded portion of the mounting aperture, and once the fastening element is threaded into the threaded portion, crimping the collar onto the fastening element. The method further includes hardening the clip and the fastening element.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Conventional stud clip assemblies utilize a press fit, or an interference fit, to assemble a clip and a fastening element. The use of a press fit for assembly typically requires that the fastening element be assembled to the clip prior to the clip being bent or formed into its final shape. The bending of the clip after assembly to the fastening element requires high tonnage equipment to deform the completed clip. Generally, the high tonnage equipment is specific to the forming process and may not be applicable to other clip assemblies.

The present disclosure overcomes these deficiencies in conventional stud clip assemblies by leveraging a threaded engagement between the fastening element and the clip. Threaded features may be formed on the clip after the clip is fully formed, which negates the need to deform the clip after assembly with the fastening element and allows the clip to define more complex geometries. In addition, the threaded features on the clip may retain the fastening element and prevent inadvertent disassembly.

Figure 1:
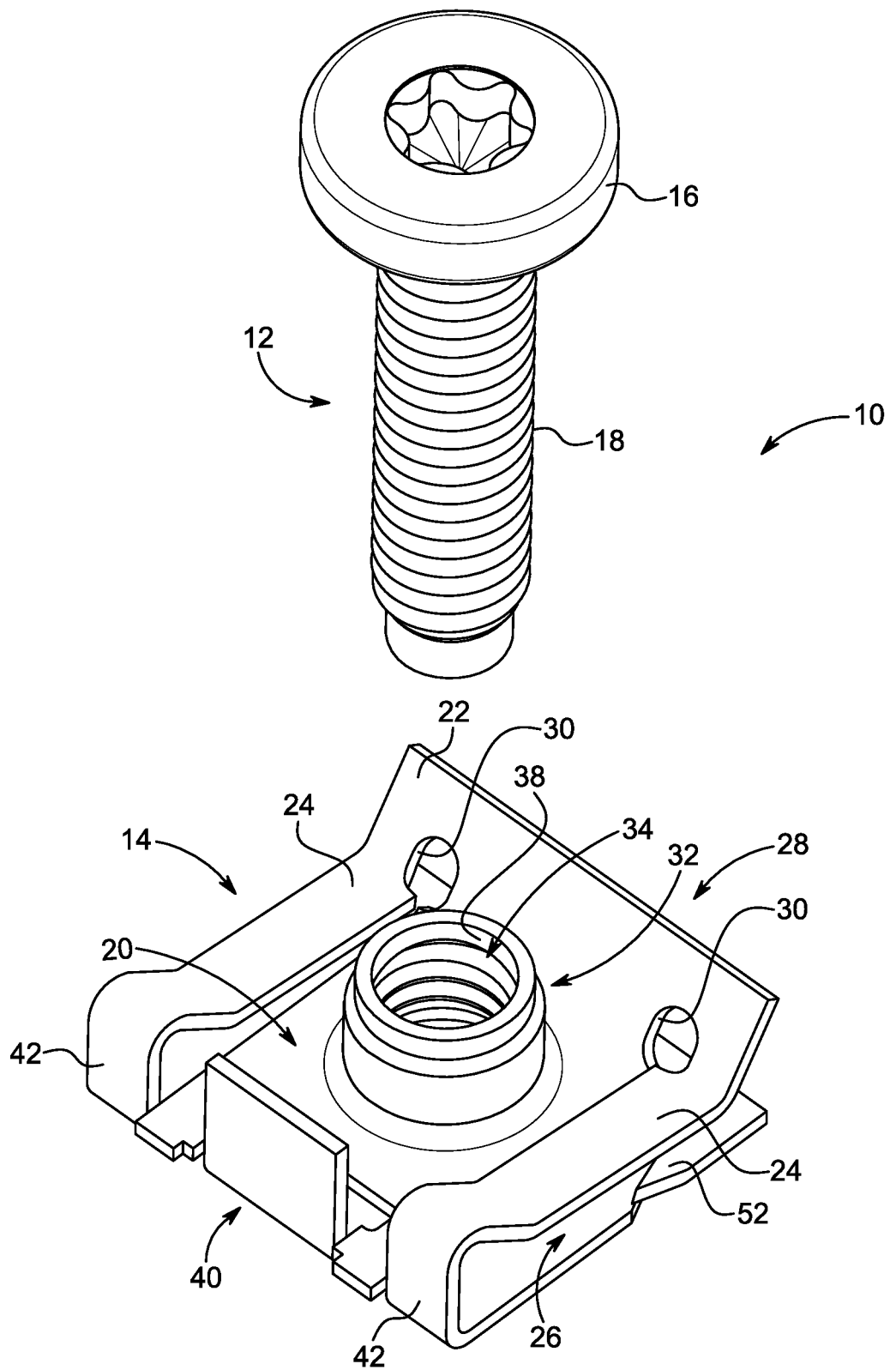
FIG. 1 is an exploded bottom, back, left isometric view of a stud clip assembly according to the present disclosure.
Figure 2:
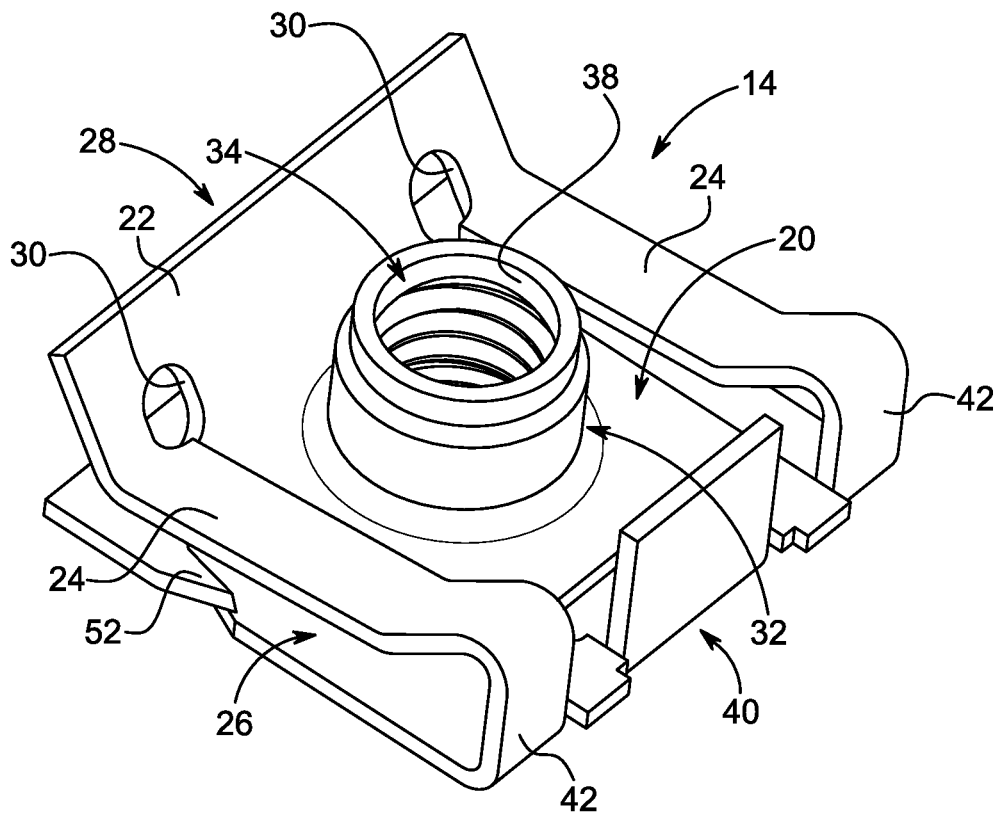
FIG. 2 is a bottom, front, left, isometric view of a clip of the stud clip assembly of FIG. 1.
Figure 3:
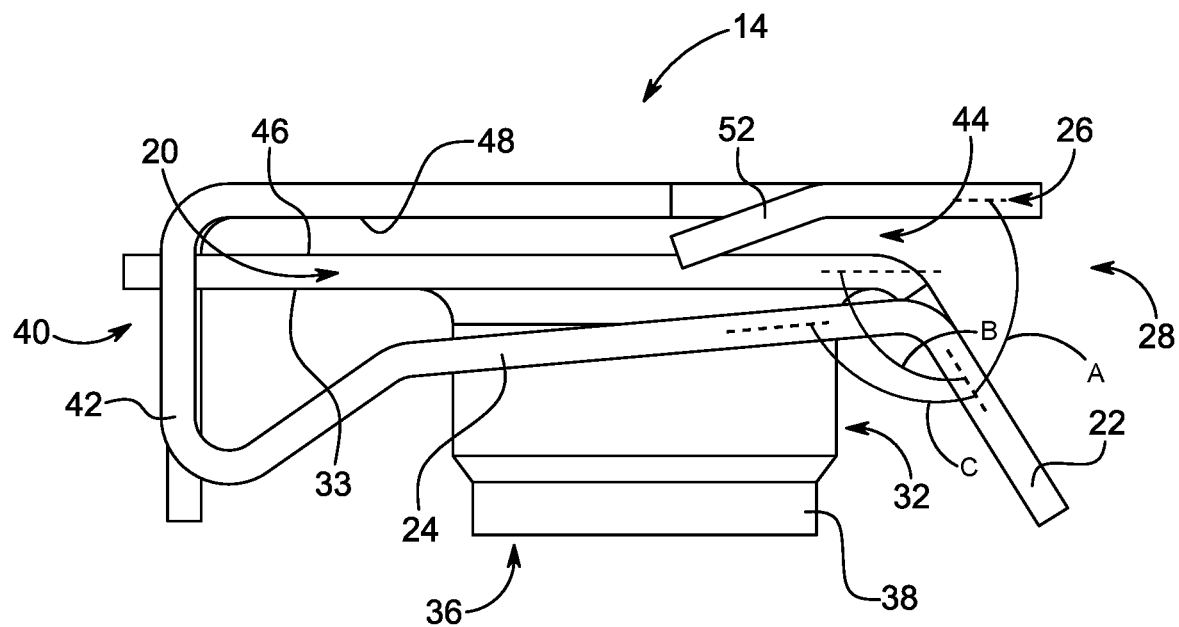
FIG. 3 is a front view of the clip of the of FIG. 2.
Figure 4:
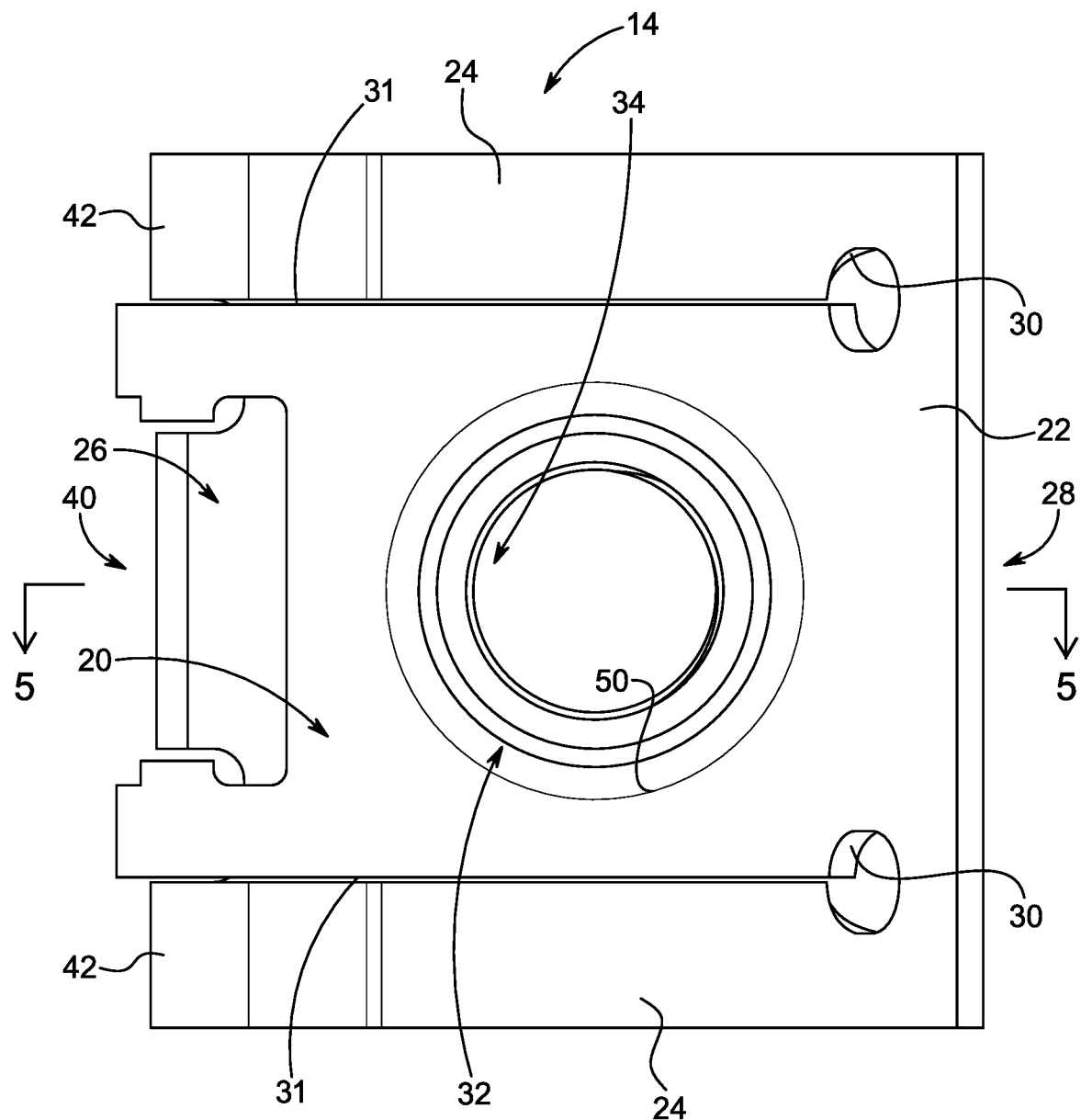
FIG. 4 is a bottom plan view of the clip of FIG. 2.

FIG. 1 illustrates a stud clip assembly 10 according to the present disclosure. The stud clip assembly 10 includes a fastening element 12 and a clip 14. In the illustrated non-limiting example, the fastening element 12 may be in the form of a stud that includes a head 16 and a threaded shaft 18 extending axially away from the head 16. The use of the term "stud" herein is generic to fastening elements that include an externally-threaded shaft (e.g., screws, bolts, threaded rods, etc.).

In some non-limiting examples, the clip 14 may be fabricated as a unitary component (i.e., manufactured from a single piece of material). In some non-limiting examples, the clip 14 may be fabricated from a metal material.

As illustrated in FIGS. 2-5, the clip 14 includes a mounting platform 20, an angled portion 22, one or more arms 24, and a retention platform 26. In the illustrated non-limiting example, the angled portion 22 may be arranged on a first side 28 of the clip 14. The angled portion 22 may extend from one end of the mounting platform 20 in a direction away from the retention platform 26. In some non-limiting examples, the angled portion 22 may extend from the end of the mounting platform 20, such that an angle A (see FIG. 3) between ten and eighty degrees is formed between the angled portion 22 and the retention platform 26.

In the illustrated non-limiting example, the mounting platform 20 may define a generally hinged relationship with respect to the arms 24 and the retention platform 26. That is, the mounting platform 20 may be at least partially separated from the arms 24 and the retention platform 26, such that the mounting platform 20 may flex relative to the arms 24 and the retention platform 26. In the illustrated non-limiting example, the angled portion 22 may include a pair of apertures 30 laterally separated from one another and that extend through the angled portion 22. The pair of apertures 30 may be define a junction at which the hinged connection between the mounting platform 20 and the arms 24 is formed. For example, the material surrounding the apertures 30 may provide the only connection between the mounting platform 20 and the arms 24, and lateral slots or gaps 31 may be arranged on opposing lateral sides of the mounting platform 20 between the remainder of the mounting platform 20 and the arms 24 (see FIG. 4). In this way, for example, the mounting platform 20 may be allowed to flex relative to the arms 24 and the retention platform 26 (e.g., in a up-and-down direction from the perspective of FIG. 3). In some non-limiting examples, the apertures 30 may provide increased structural integrity to the clip 14 to support the flexibility of the mounting platform 20. For example, a rounded or curved profile defined by the apertures 30 may eliminate sharp corners formed at the junction at which the hinged connection between the mounting platform 20 and the arms 24, which aids in preventing stress concentrations that occur during the flexing of the mounting platform 20

The mounting platform 20 includes a stud mounting bore 32 that extends away from a first surface 33 of the mounting platform 20 (i.e., away from the retention platform 26). In some non-limiting examples, the stud mounting bore 32 may be formed by a drawing process. The stud mounting bore 32 may define a mounting aperture 34 formed on an inner surface thereof that extends through the mounting platform 20. The mounting aperture 34 may define a central axis D that extends through the stud mounting bore 32 (see FIG. 5). The mounting aperture 34 may include a threaded portion having internal threads formed axially along a portion thereof. In the illustrated non-limiting example, a first end 36 of the mounting aperture 34, which is arranged axially away from the mounting platform 20, may include a collar 38 that is not threaded (see FIG. 5). The threaded portion of the mounting aperture 34 may extend from an axial end of the collar 38 to the mounting platform 20.

The arms 24 may extend from the angled portion 22 at a different angle than the mounting platform 20. In the illustrated non-limiting example, a smaller angle may be formed between the arms 24 and the angled portion 22 than between the mounting platform 20 and the angled portion 22. For example, an angle B defined between the mounting platform 20 and the angled portion 22 may be larger than an angle C defined between the arms 24 and the angled portion 22 (see FIG. 3). The arms 24 may extend from the first side 28 of the clip 14 to a second side 40 of the clip 14. At the second side 40 of the clip 14, the arms 24 may form a generally U-shaped portion 42 and extend around to the retention platform 26.

In general, the retention platform 26 may be substantially parallel to the mounting platform 20. A gap, or slot, 44 may be formed axially (e.g., in a direction parallel to the center axis C) between a second side 46 of the mounting platform 20 and a first side 48 of the retention platform 26. During assembly, a component may be received within the slot 44 formed between the mounting platform 20 and the retention platform 26.

The retention platform 26 includes a retention aperture 50 and a plurality of retention tabs 52 that extend toward the second side 46 of the mounting platform 20. The retention aperture 50 extends through the retention platform 26 and is axially aligned with the mounting aperture 34 to enable the fastening element 12 to extend therethrough, when the stud clip assembly 10 is assembled.

In the illustrated non-limiting example, the retention tabs 52 may angle away from the first side 28 of the clip 14 in a direction toward the mounting platform 20. The retention tabs 52 may be arranged on opposing edges of the retention platform 26. In the illustrated non-limiting example, the retention platform 26 includes two retention tabs, one arranged on each opposing edge thereof. In some non-limiting examples, the retention platform 26 may include more than two retention tabs 52 (e.g., four retention tabs 52, with two arranged on each opposing edge). In operation, the retention tabs 52 may aid in retaining a component installed within the slot 44.

One non-limiting example of manufacture and operation of the stud clip assembly 10 will be described with reference to FIGS. 1-7. In some non-limiting examples, the clip 14 may be manufactured using a metal stamping process. In some non-limiting examples, the stud mounting bore 32 may be formed on the clip 14 and the clip 14 may be bent into a desired shape (e.g., the shape illustrated in FIGS. 1-7).

Figure 5:
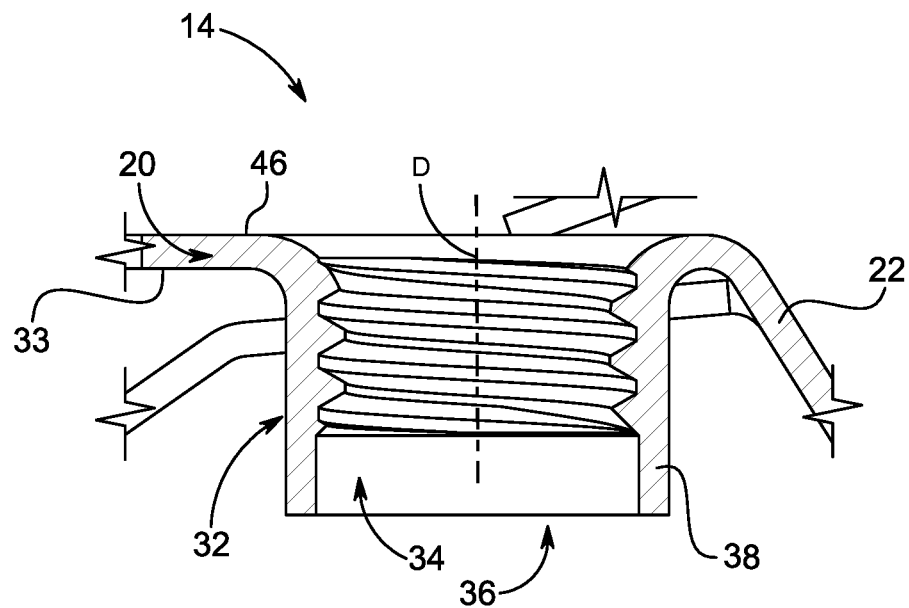
FIG. 5 is a partial cross-sectional view of the clip of FIG. 3, prior to assembly with a fastening element, taken along line 5-5 in FIG. 4.
Figure 6:
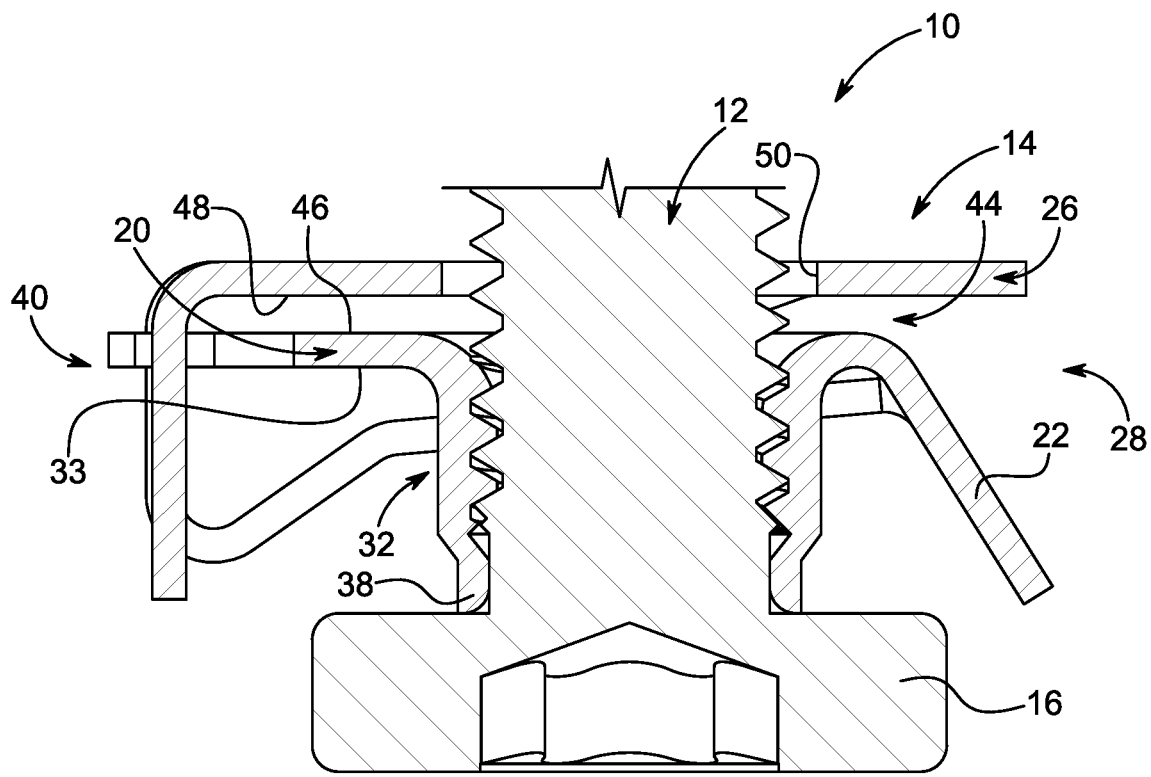
FIG. 6 is a cross-sectional view of the stud clip assembly of FIG. 5 with the clip assembled to a fastening element.

Prior to assembly of the fastening element 12 to the clip 14, the stud mounting bore 32 may define a generally constant outer diameter along an outer surface thereof (see FIG. 5). With the clip 14 in this state, the fastening element 12 may be threaded into the mounting aperture 34. Once the fastening element 12 is threaded through the mounting aperture 34 to a desired depth (e.g., when the head 16 engages the first end 36 of the mounting aperture 34), the collar 38 may be deformed (e.g., crimped) to the fastening element 12 (see FIG. 6). That is, the collar 38 may be crimped (e.g., reduced in diameter) to engage the fastening element 12, which prevents the fastening element 12 from disassembling (e.g., unthreading) from the clip 14. Once the fastening element 12 is threaded into and crimped on the mounting aperture 34 of the clip 14, the fastening element 12 and the clip 14 may undergo a hardening process to aid in preventing the clip 14 from future deformation.

Figure 7:
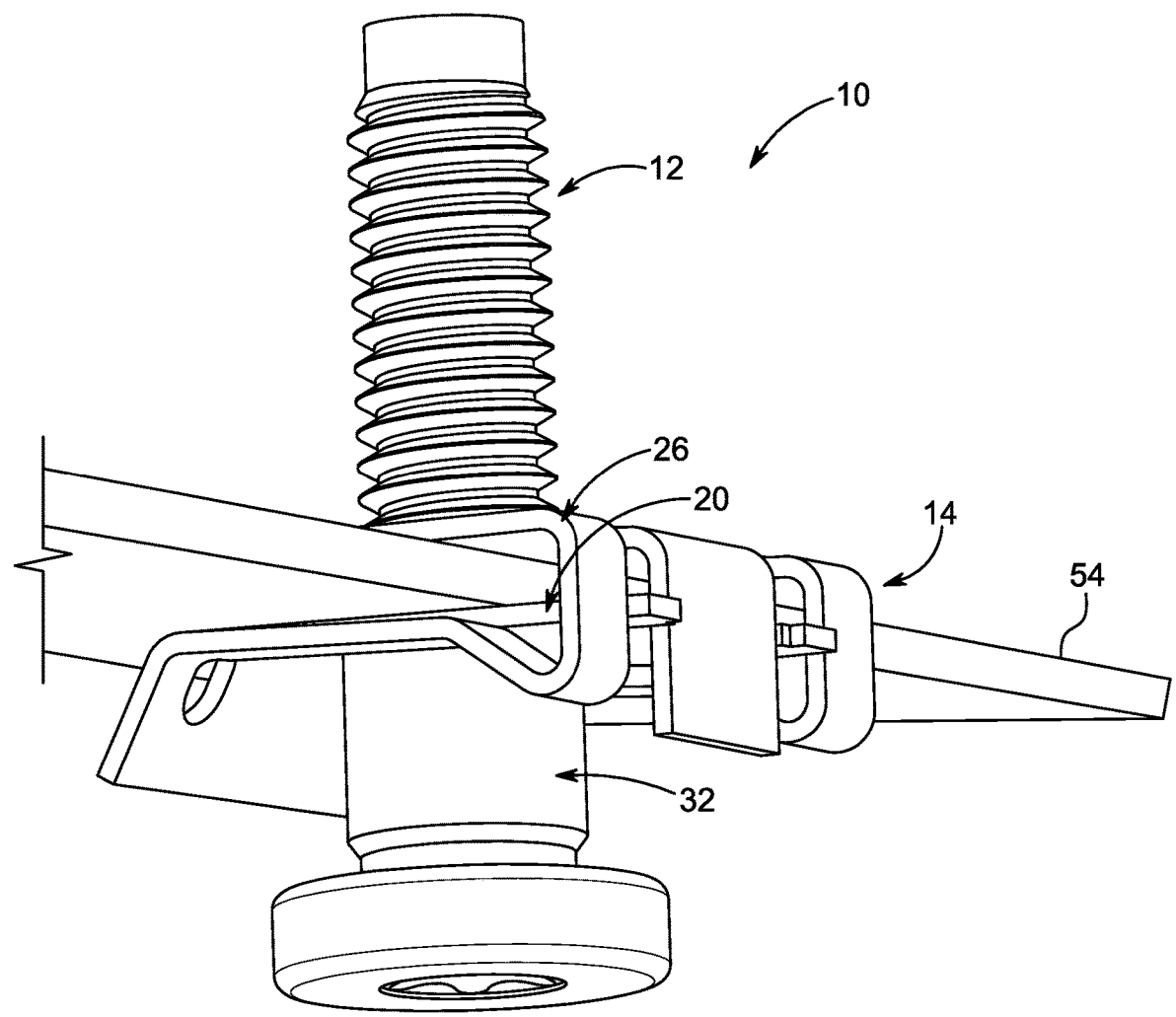
FIG. 7 is a top, front, left isometric view of the stud clip assembly of FIG. 1 assembled to a component.

Turning to FIG. 7, with the fastening element 12 and the clip 14 hardened, the stud clip assembly 10 may receive and fasten to a component 54 (e.g., a plate, a panel, a conduit, etc.). In some non-limiting examples, the component 54 may be part of an automotive vehicle or sub-assembly within an automotive vehicle. In general, the component 54 may be inserted into the clip 14, such that the component is received within the slot 44. The angled portion 22 may aid in guiding the component into the slot 44 during assembly. In some non-limiting examples, the component may include a cutout that enables the component to be inserted into the slot 44 and past the fastening element 12. Once the component is inserted to a desired position within the slot 44, a nut may be threaded onto the fastening element 12 to fasten the component 54 to the stud clip assembly 10. In addition, the retention tabs 52 may aid in preventing the component 54 from displacing within or being removed from the slot 44. For example, the angle defined by the retention tabs 52 relative to the retention platform generally oppose the removal of the component 54 from the slot 44.

The threaded and crimped engagement between the fastening element 12 and the clip 14 allows the clip 14 to be formed, or bent, to a desired shape prior to assembly with the fastening element 12, which saves manufacturing time and equipment costs when compared to conventional stud clips.

In addition, the crimping and hardening of the clip 14 prevents inadvertent disassembly of the stud clip assembly 10.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A stud clip assembly, comprising:
   a clip including a mounting platform and a retention platform, the mounting platform including a mounting bore that extends away from the retention platform and that defines a mounting aperture, the mounting aperture including a threaded portion formed therein and a non-threaded collar arranged at a first end thereof; and
   a fastening element configured to be received within the collar of the mounting aperture and threaded into the threaded portion of the mounting aperture,
   wherein the collar is configured to be crimped onto the fastening element to retain the fastening element within the mounting aperture, and
   wherein the retention platform includes one or more retention tabs that extend at an angle toward the mounting platform.

2. The stud clip assembly of claim 1, wherein the clip further includes an angled portion arranged on a first side thereof and that extends at an angle in a direction away from the retention platform.

3. The stud clip assembly of claim 1, wherein the mounting platform is configured to flex relative to the retention platform.

4. The stud clip assembly of claim 1, wherein the clip further includes one or more arms that extend from an angled portion and around in a general U-shape to the retention platform.

5. The stud clip assembly of claim 4, wherein the one or more arms are partially separated from the mounting platform.

6. The stud clip assembly of claim 4, wherein the angled portion includes a pair of apertures laterally separated from one another and that extend through the angled portion, the pair of apertures defining a junction at which a hinged connection between the mounting platform and the one or more arms is formed.

7. The stud clip assembly of claim 1, wherein a slot is formed between the mounting platform and the retention platform.

8. The stud clip assembly of claim 1, wherein the threaded portion includes internal threads that extend from the mounting platform to an end of the collar that is arranged between the first end of the mounting aperture and the mounting platform.

9. A clip for a stud clip assembly, comprising:
   a mounting platform including a mounting bore that defines a mounting aperture, the mounting aperture having a threaded portion formed therein and a non-threaded collar arranged at a first end thereof; and
   a retention platform connected to the mounting platform by one or more arms, the retention platform being disposed substantially parallel to the mounting platform,
   wherein a gap is formed between the mounting platform and each of the one or more arms at laterally opposing sides of the mounting platform such that the mounting platform is configured to flex relative to the retention platform, and
   wherein the threaded portion includes internal threads that extend from the mounting platform to an end of the collar that is arranged between the first end of the mounting aperture and the mounting platform.

10. The clip of claim 9, wherein the mounting platform further includes an angled portion extending from a first side thereof at an angle in a direction away from the retention platform.

11. The clip of claim 10, wherein the one or more arms extend from the angled portion and around in a general U-shape to the retention platform.

12. The clip of claim 10, wherein the angled portion includes a pair of apertures laterally separated from one another and that extend through the angled portion.

13. The clip of claim 12, wherein the pair of apertures define a junction at which a hinged connection between the mounting platform and the one or more arms is formed.

14. The clip of claim 9, wherein a slot is formed between the mounting platform and the retention platform.

15. The clip of claim 9, wherein the retention platform includes one or more retention tabs that extend at an angle toward the mounting platform.

* * * * *